United States Patent [19]

Sesser et al.

[11] Patent Number: 5,581,886
[45] Date of Patent: Dec. 10, 1996

[54] PLIER-TYPE TUBING CUTTER

[76] Inventors: Gregory L. Sesser; Michael W. Johnson, both of 1025 Lone Palm Ave. #2J, Modesto, Calif. 95351

[21] Appl. No.: 502,384

[22] Filed: Jul. 14, 1995

[51] Int. Cl.⁶ .................................................. B23D 21/08
[52] U.S. Cl. .................................................. 30/101; 30/102
[58] Field of Search ............................ 30/94, 101, 102, 30/134; 81/182

[56]     References Cited

U.S. PATENT DOCUMENTS

| | | | |
|---|---|---|---|
| 1,482,206 | 1/1924 | Tuley | 30/102 |
| 2,515,627 | 7/1950 | Capewell | 30/102 |
| 3,025,597 | 3/1962 | Huglin | 30/102 |
| 3,249,998 | 5/1966 | Shultz | 30/101 |
| 3,672,050 | 6/1972 | Hanback | 30/99 |
| 4,847,997 | 7/1989 | Petty | 30/102 X |
| 4,858,316 | 8/1989 | Dubey | 30/102 |
| 5,033,153 | 7/1991 | Post | 30/102 |
| 5,099,577 | 3/1992 | Hutt | 30/101 |

*Primary Examiner*—Hwei-Siu Payer

[57]     ABSTRACT

A cutter for effecting severing of a conduit. The inventive device includes first and second handle members pivotally coupled together and including first an second jaws. Cutting assemblies are supported within each jaw and include a pail or spaced and rotatable cutting disks which engage an exterior of a conduit to effect cutting thereof during manual rotation of the tool.

1 Claim, 3 Drawing Sheets

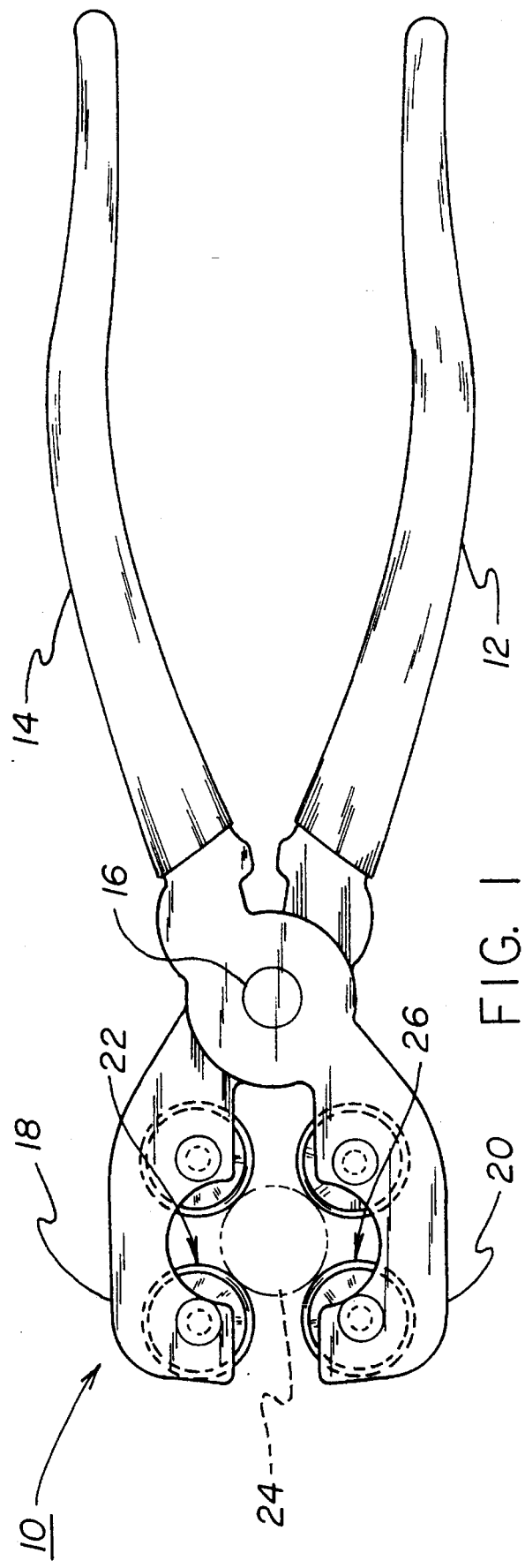
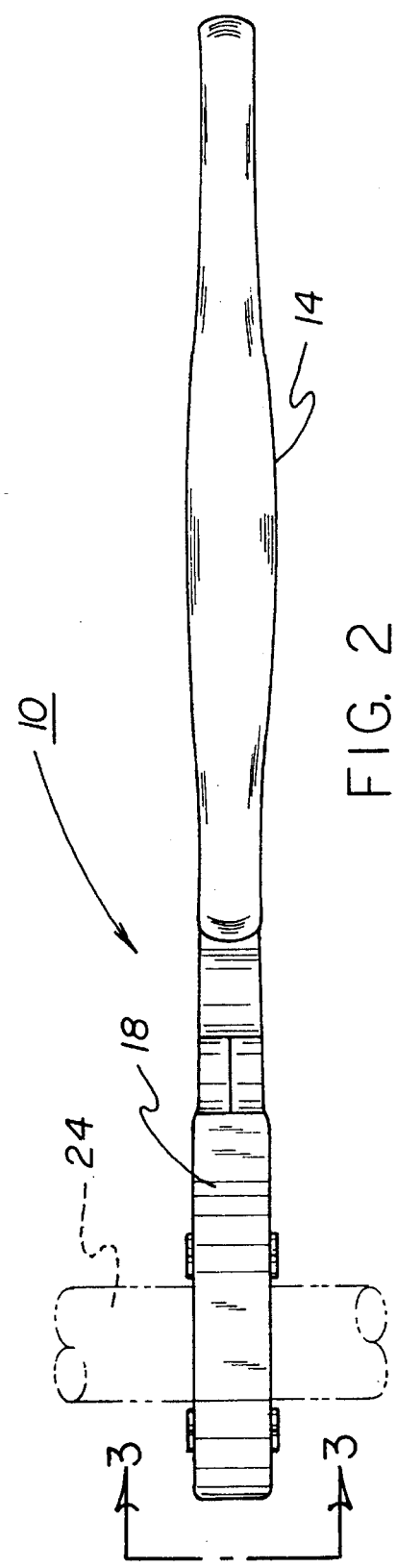

PLIER-TYPE TUBING CUTTER

BACKGROUND OF THE INVENTION

1. Field of the Invention

The present invention relates to cutting devices and more particularly pertains to a plier-type tubing cutter for effecting severing of a conduit.

2. Description of the Prior Art

The use of cutting devices is known in the prior art. More specifically, cutting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art cutting devices include U.S. Pat. No. 5,206,996; U.S. Pat. No. 3,672,050; U.S. Pat. No. 3,526,960; U.S. Pat. No. 3,807,046; U.S. Pat. No. 4,958,434; and U.S. Pat. No. Des. 312,953.

While these devices fulfill their respective, particular objectives and requirements, the aforementioned patents do not disclose a plier-type tubing cutter for effecting severing of a conduit which includes first and second handle members pivotally coupled together and including a first and second jaws, with cutting means supported within each jaw and including a pair of spaced and rotatable cutting disks which engage an exterior of a conduit to effect cutting thereof during manual rotation of the tool.

In these respects, the plier-type tubing cutter according to the present invention substantially departs from the conventional concepts and designs of the prior art, and in so doing provides an apparatus primarily developed for the purpose of effecting severing of a conduit.

SUMMARY OF THE INVENTION

In view of the foregoing disadvantages inherent in the known types of cutting devices now present in the prior art, the present invention provides a new plier-type tubing cutter construction wherein the same can be utilized for severing a conduit. As such, the general purpose of the present invention, which will be described subsequently in greater detail, is to provide a new plier-type tubing cutter apparatus and method which has many of the advantages of the cutting devices mentioned heretofore and many novel features that result in a plier-type tubing cutter which is not anticipated, rendered obvious, suggested, or even implied by any of the prior art cutting devices, either alone or in any combination thereof.

To attain this, the present invention generally comprises a cutter for effecting severing of a conduit. The inventive device includes first and second handle members pivotally coupled together and including first and second jaws. Cutting assemblies are supported within each jaw and include a pair of spaced and rotatable cutting disks which engage an exterior of a conduit to effect cutting thereof during manual rotation of the tool.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new plier-type tubing cutter apparatus and method which has many of the advantages of the cutting devices mentioned heretofore and many novel features that result in a plier-type tubing cutter which is not anticipated, rendered obvious, suggested, or even implied by any of the prior art tool guides, either alone or in any combination thereof.

It is another object of the present invention to provide a new plier-type tubing cutter which may be easily and efficiently manufactured and marketed.

It is a further object of the present invention to provide a new plier-type tubing cutter which is of a durable and reliable construction.

An even further object of the present invention is to provide a new plier-type tubing cutter which is susceptible of a low cost of manufacture with regard to both materials and labor, and which accordingly is then susceptible of low prices of sale to the consuming public, thereby making such plier-type tubing cutters economically available to the buying public.

Still yet another object of the present invention is to provide a new plier-type tubing cutter which provides in the apparatuses and methods of the prior art some of the advantages thereof, while simultaneously overcoming some of the disadvantages normally associated therewith.

Still another object of the present invention is to provide a new plier-type tubing cutter for effecting severing a conduit.

Yet another object of the present invention is to provide a new plier-type tubing cutter which includes first and second handle members pivotally coupled together and including a first and second jaws, with cutting means supported within each jaw and including a pair of spaced and rotatable cutting disks which engage an exterior of a conduit to effect cutting thereof during manual rotation of the tool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an elevation view of a plier-type tubing cutter according to the present invention in use.

FIG. 2 is a top plan view of the invention in use.

DESCRIPTION OF THE PREFERRED EMBODIMENT

Figure 3:
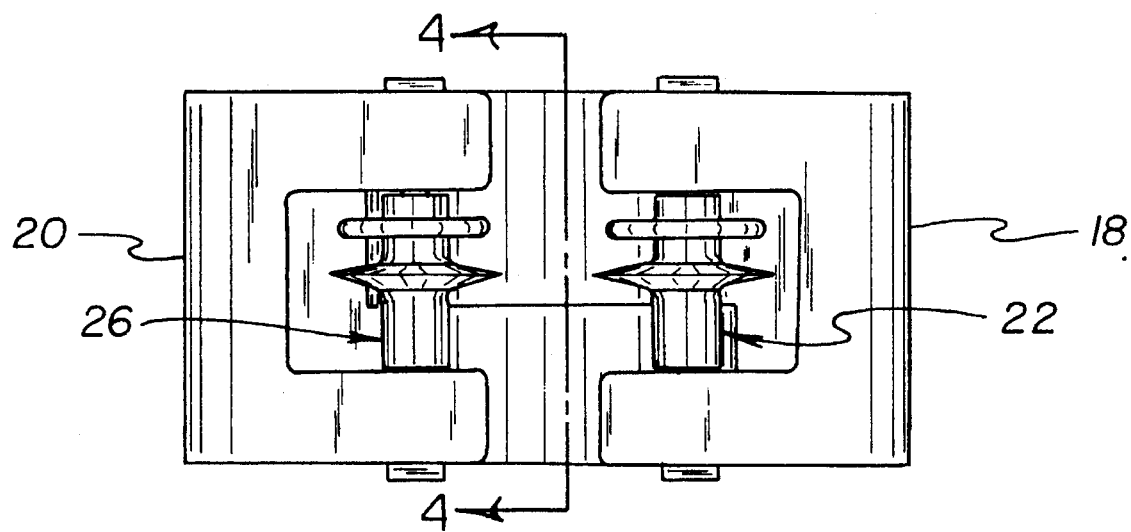
FIG. 3 is an end elevation view taken from line 3—3 of FIG. 2.
Figure 4:
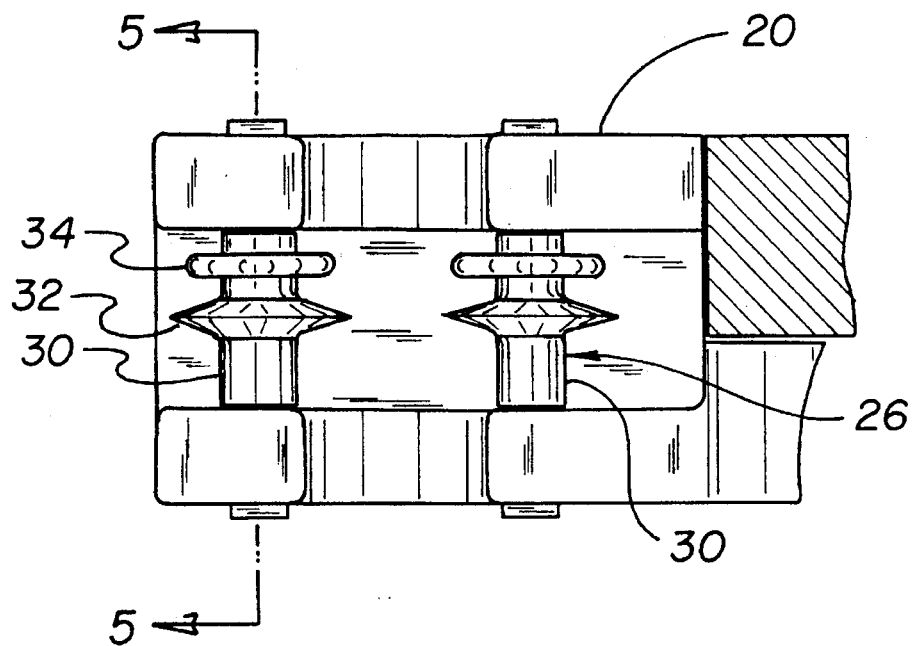
FIG. 4 is an elevation view taken from line 4—4 of FIG. 3.
Figure 5:
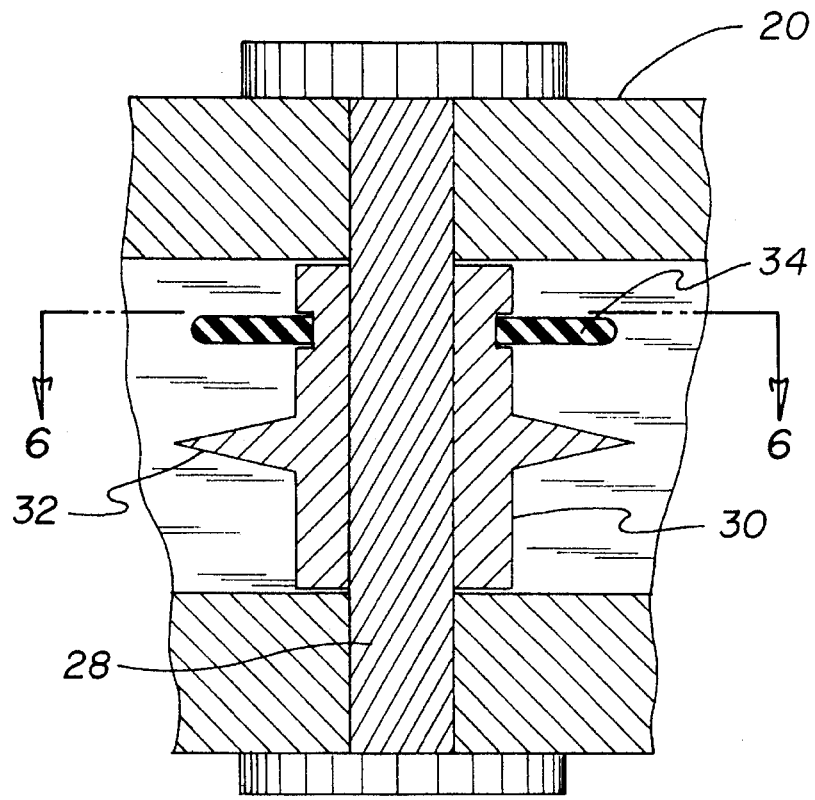
FIG. 5 is a cross sectional view taken along 5—5 of FIG. 4.
Figure 6:
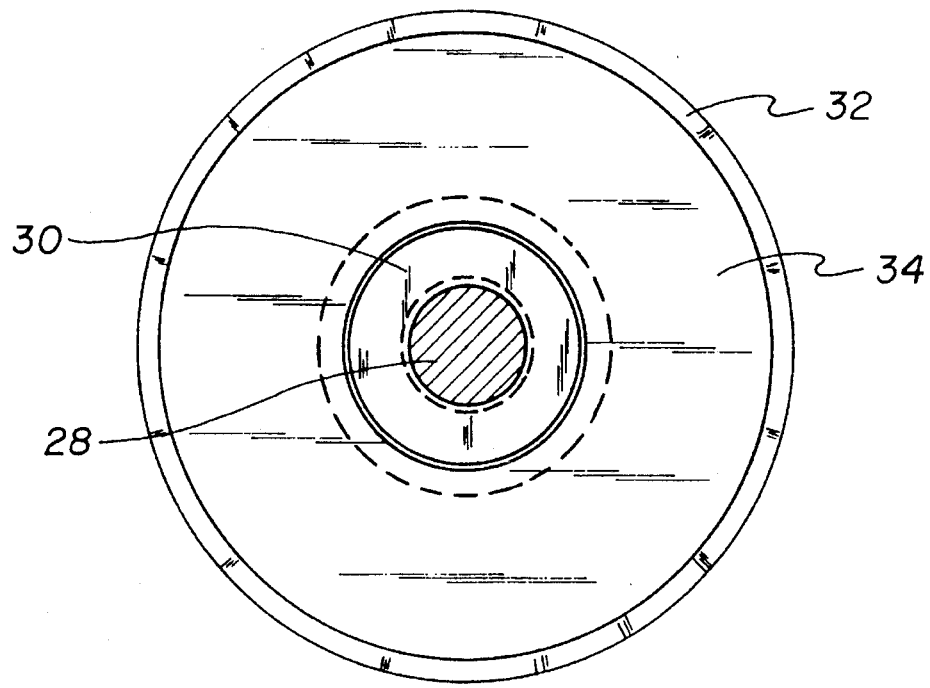
FIG. 6 is a cross sectional view taken along line 6—6 of FIG. 5.

With reference now to the drawings, and in particular to FIGS. 1–6 thereof, a new plier-type tubing cutter embodying the principles and concepts of the present invention and generally designated by the reference numeral 10 will be described.

More specifically, it will be noted that the plier-type tubing cutter 10 comprises a first handle member 12 pivotally mounted to a second handle member 14 by a pivot pin 16 extending therebetween. The first and second handle members 12 and 14 extend past the pivot pin 16 so as to define respective first and second jaw members 18 and 20. The jaw members 18 and 20 are oppositely oriented relative to the first and second handle members 12 and 14 such that a closing of the handle members will result in a closing of the jaw members in a manner similar to that of a pair of conventionally known pliers. A first cutting means 22 is mounted within the first jaw member 18 for engaging and cutting an exterior surface of a conduit 24 as the device 10 is rotated thereabout. Similarly, a second cutting means 26 is mounted to the second jaw member 20 for engaging and cutting a conduit 24 in cooperation with the first cutting means 22. By this structure, a conduit 24 can be positioned between the cutting means 22 and 26, whereby a compression of the handle members 12 and 14 together with a concurrent rotation of the entire device 10 about the conduit 24 will effect severing of the conduit 24 at a desired location, as shown in FIGS. 1 and 2 of the drawings.

Referring now to FIGS. 3 through 6 wherein the present invention 10 is illustrated in detail, it can be shown that the first and second cutting means 22 and 26 are substantially similar in design and configuration and each comprise an elongated axle 28 supported by the respective jaw member 18 or 20 so as to reside in a substantially parallel orientation relative to the pivot pin 16 of the device 10. A cylindrical member 30 is rotatably mounted about the axle 28 and includes an annular cutting disk 32 projecting radially outwardly therefrom. The annular cutting disk 32 terminates in an unlabeled annular cutting edge which is sharpened so as to pierce at least an exterior of the conduit 24 as the respective cutting means 22 or 26 is engaged therewith. To resiliently guide the respective cutting means 22 and 26 relative to the conduit 24, and to retain a severed portion of the conduit 24 subsequent to cutting thereof, the cutting means 22 and 26 may each further comprise an annular guide bushing 34 of flexible polymeric construction projecting radially outwardly from the cylindrical member 30 and positioned so as to reside within a plane substantially parallel to a plane containing the annular cutting disk 32. Preferably, the annular guide bushing 34 resides within an unlabeled annular groove extending circumferentially about the cylindrical member 30.

As best illustrated in FIGS. 1 and 3, it can be shown that each of the jaw members 18 and 20 is shaped so as to define an unlabeled semi-circular receiving notch directed thereinto so as to accommodate the conduit 24 during use of the device 10 as shown in FIG. 1. As shown in FIG. 3, each of the jaw members 18 and 20 is bifurcated, with the axles 28 of the cutting means 22 and 26 extending between the substantially spaced and parallel furcations of the respective jaw members 18 and 20.

Preferably, each of the cutting means 22 and 26 includes a pair of axles 28 coupled to the respective jaw member 18 and 20 on opposed sides of the semi-circular notch directed thereinto. Each of the axles 28, of course, includes an individual cylindrical member 30 having an annular cutting disk 32 extending therefrom. By this structure, each of the cutting means 22 includes two cutting disks 32, thereby permitting an individual to sever the conduit 24 through a rotation of the handle members 12 and 14 through an arc of only ninety degrees. Further, the pair of cutting disks 32 of each of the cutting means 22 and 26 provides an element of redundancy, wherein failure of an individual one of the cutting disks 32 will not preclude operation of the device 10.

In use, the plier-type tubing cutter 10 according to the present invention can be easily utilized for effecting severing of a conduit 24, such as is shown in FIGS. 1 and 2 of the drawings. To this end, the conduit 24 can be positioned between the jaw members 18 and 20, whereby a compression of the handle members 12 and 14 together will effect engaging of the cutting means 22 and 26 against an exterior of the conduit 24. The device 10 can then be circumferentially rotated about the conduit 24 so as to create a circumferentially extending incision through the exterior surface of the conduit 24 which will subsequently lead to a fracturing or severing of the conduit.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the pans of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Parent of the United States is as follows:

1. A plier-type tubing cutter comprising:

a first handle member;

a second handle member pivotally mounted to the first handle member by a pivot pin extending therebetween, the first and second handle members extending past the pivot pin to define respective first and second jaw members, the jaw members being oppositely oriented relative to the first and second handle members such that a closing of the handle members will result in a closing of the jaw members;

a first cutting means mounted within the first jaw member for engaging and cutting an exterior surface of a conduit as the cutter is rotated thereabout; and a second cutting means mounted within the second jaw member for engaging and cutting a conduit in cooperation with the first cutting means;

wherein the first and second cutting means each comprises an elongated axle supported by the respective jaw member so as to reside in a substantially parallel orientation relative to the pivot pin; a cylindrical member rotatably mounted about the axle and including an annular cutting disk projecting radially outwardly therefrom, the annular cutting disk terminating in a sharpened annular cutting edge, the cutting means each further comprising an annular guide bushing of flexible polymeric construction projecting radially outwardly from the cylindrical member and positioned so as to reside within a plane substantially spaced from and parallel to a plane containing the annular cutting disk so as to resiliently guide the respective cutting means relative to a conduit and to retain a severed portion of the conduit subsequent to cutting thereof, wherein the cylindrical member is shaped so as to define an annular groove extending circumferentially thereabout, with the annular guide bushing residing within the annular groove, wherein each of the jaw members is shaped so as to define a semi-circular receiving notch directed thereinto so as to extend at least partially about a conduit when clamped between the jaw members and each of the jaw members is bifurcated, with the axles of the cutting means extending between substantially spaced and parallel furcations of the respective jaw members, each cutting means further including a pair of axles coupled to the respective jaw member on opposed sides of the semi-circular notch directed thereinto, and a pair of the cylindrical members rotatably mounted about the axles and including an annular cutting disk projecting radially outwardly from each said cylindrical member, with the annular cutting disk terminating in a sharpened annular cutting edge.

* * * * *